United States Patent [19]

Muntz

[11] 4,058,837
[45] Nov. 15, 1977

[54] PROJECTION TELEVISION RECEIVER

[76] Inventor: Earl W. Muntz, 3416 Alana Drive, Sherman Oaks, Calif. 91403

[21] Appl. No.: 720,681

[22] Filed: Sept. 7, 1976

[51] Int. Cl.² .......................................... H04N 5/655
[52] U.S. Cl. ...................................... 358/237; 358/250
[58] Field of Search ................ 358/250, 237, 238, 239

[56] References Cited

U.S. PATENT DOCUMENTS

| 2,165,078 | 7/1939 | Toulon | 358/250 |
|---|---|---|---|
| 2,512,123 | 6/1950 | Weimer | 358/239 |
| 3,943,282 | 3/1976 | Muntz | 358/238 |
| 3,944,734 | 3/1976 | Ogawa | 358/250 |

Primary Examiner—Howard W. Britton
Attorney, Agent, or Firm—Keith D. Beecher

[57] ABSTRACT

A projection television receiver is provided in which a large size image is projected from the viewing screen of a conventional television receiver to a larger display screen. The display screen is mounted in an essentially vertical position on top of and to the rear of a cabinet. The conventional television receiver is mounted face-down within the cabinet, and an optical system is provided which projects an image from the viewing screen of the television receiver to the enlarged display screen. The optical system includes a mirror positioned in a slide. The slide is mounted in the cabinet, and it may be pulled out from the front wall of the cabinet to draw the mirror into the proper position so that the image on the viewing screen of the television receiver may be projected in an enlarged form over the entire surface of the display screen.

The projection television receiver of the present invention has a feature of being of relatively narrow width, especially when not in use, and when the slide is close.

3 Claims, 2 Drawing Figures

PROJECTION TELEVISION RECEIVER

BACKGROUND OF THE INVENTION

Television systems and apparatus in which images are projected onto an enlarged display screen are known. However, the prior art systems, for the most part, are excessively complex and bulky, so as to render the prior art apparatus unsuitable for use in the usual home.

Prior U.S. Pat. No. 3,943,282, which issued Mar. 9, 1976 in the name of the present inventor, provides a projection television receiver which is constructed to have a relatively narrow width and to be compact, and yet to include all the optical elements necessary to provide a bright enlarged image on a display screen.

The projection television receiver of the present invention is of the same general type as the projection television receiver shown and described in the aforesaid patent. However, the receiver of the present invention achieves the desired results by means of a different placement and different interrelationship of the various internal components of the assembly.

DETAILED DESCRIPTION OF THE ILLUSTRATED EMBODIMENT

Figure 2:
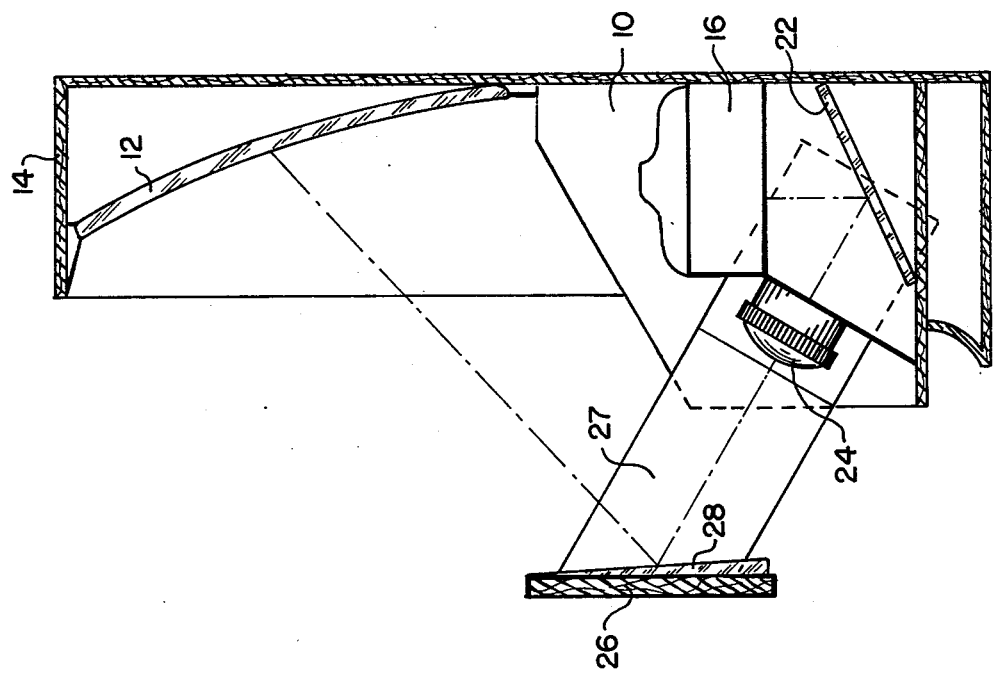
FIG. 2 is a side sectional view, taken essentially along the line 2—2 of FIG. 1.

The projection television receiver of the invention, as shown in the drawing, includes a cabinet 10, which has a display screen 12 mounted in upright position on top of the cabinet and along the rear edge thereof. The display screen 12 is surrounded by a shroud 14 which protects it from ambient light. Screen 12, for example, may be of the type described in the October 1968 issue of The Journal of The Society of Motion Picture and Television Engineers in an article entitled "High-Brightness Projection Screens With High Ambient Light Reflections", and presently sold by Eastman Kodak Company under its trademark "Kodak Ektralite Projection Screen". As shown particularly in FIG. 2, screen 12 is curved for the reasons described in the aforesaid article. The screen, for example, may have dimensions of the order of 40 × 40 inches.

A conventional television receiver 16 is mounted in the cabinet 10 with its viewing screen facing downwardly. A mirror 22 is mounted in the cabinet directly under the viewing screen of the receiver. Projection lens 24 is also mounted in the cabinet, and mirror 22 reflects the image on the viewing screen of television receiver 16 through the projection lens 24. The mirror 22, for example, may have dimensions of 8 × 10 inches. Projection lens 24, for example, may be of the type presentedly marketed by the Eastman Kodak Company under the designation "Aero Extra (f2.5,305mm)".

A slide 26 is mounted in the front of the cabinet 10, and it is slidable into and out of the cabinet on any appropriate slide mechanism 27. In the illustrated embodiment, slide 26 is constructed so that when the projection television receiver is not in use, the slide can be moved in adjacent to the front wall of the cabinet to minimize the overall width of the projection television receiver. In a constructed embodiment, the width of cabinet 10 is 25 inches, and the displacement of slide 26 from the front wall of the cabinet when fully extended is 14 inches.

Figure 1:
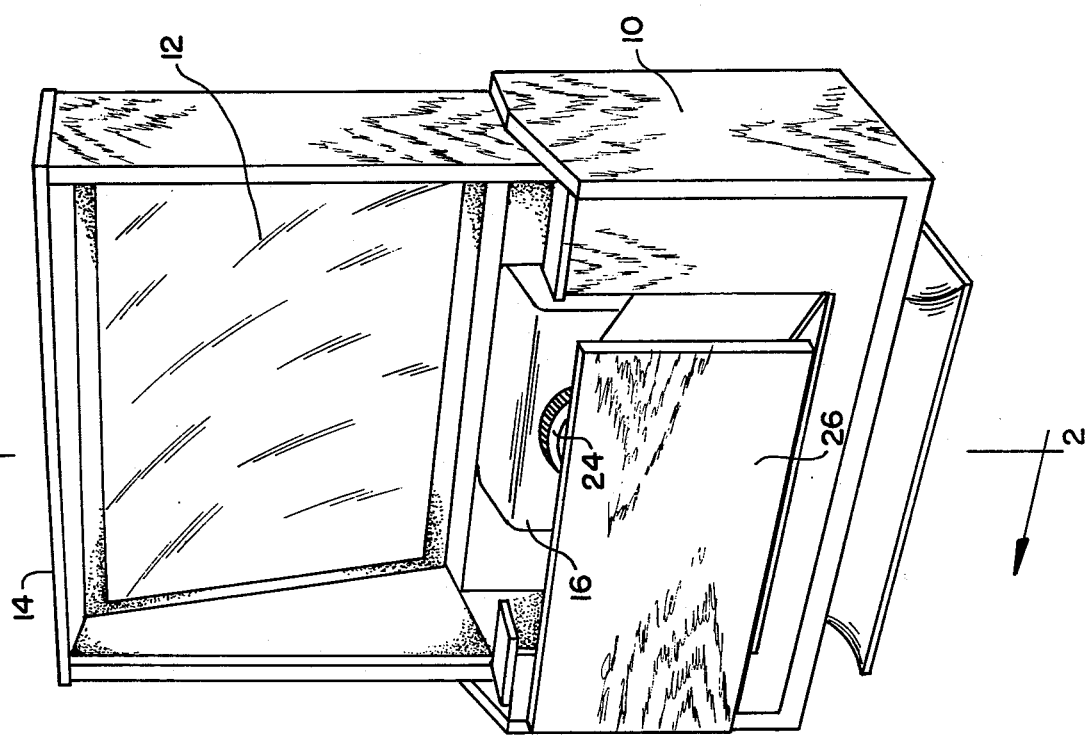
FIG. 1 is a front perspective view of apparatus constructed to incorporate the concepts of the invention, in accordance with one embodiment.

A mirror 28 is mounted on the rear surface of slide 26, and mirror 28 serves to reflect the image from the projection lens 24 rearwardly and upwardly to displace screen 12. Mirror 28, for example, may have dimensions of 14 × 20 inches. The optical system of the projection television receiver of the present invention is designed so that when the slide 26 is pulled out to its extended position shown in FIGS. 1 and 2, the image projected from the lens 24 is directed to display screen 12 with a size such that it completely covers the viewing surface of the display screen.

In a constructed embodiment, the sum of the distances between the projection lens 24 and mirror 22 and from mirror 22 to the viewing screen of the television receiver is 12 inches; and the sum of the distances from projection lens 24 to mirror 28, and from mirror 28 to screen 12 is 66 inches, when the slide 26 is extended. It will be understood, of course, that the dimensions and other parameters set forth above are intended merely for descriptive purposes, and are in no way to be construed as limiting the invention in any manner.

A usual remote control unit may be provided for the viewer, so that station selection and volume of television receiver 16 may be controlled from the viewing position.

The invention provides, therefore, an improved, compact and simplified projection television receiver, by which enlarged, bright, detailed images are projected onto a display screen by means of a minimum of optical components, and in a restricted projection space.

It will be appreciated that although a particular embodiment of the invention has been shown and described, modifications may be made, and it is intended in the following claims to cover all modifications which come within the true spirit and scope of the invention.

What is claimed is:

1. Television apparatus including: a cabinet; a display screen mounted in an upright position on top of said cabinet adjacent to the rear side thereof; a television receiver mounted in said cabinet having a downwardly facing viewing screen; first reflector means mounted in said cabinet directly under the viewing screen of the television receiver in an inclined position relative to said viewing screen; a slider mounted in the front of the cabinet and movable to an open position and to a closed position; a projection lens mounted in said cabinet to one side of the television receiver for directing images reflected by said first reflector means from the viewing screen of the television receiver to the surface of said slider; and a second reflector means mounted on the surface of said slider and positioned for directing the images from the viewing screen of the television receiver onto said display screen when the slider is in its open position and with a size corresponding to the size of said display screen.

2. The television apparatus defined in claim 1, in which said display screen has a curved configuration to present a concave surface to a viewer.

3. The television apparatus defined in claim 1, and which includes a shroud surrounding the display screen to protect the display screen from ambient light.

* * * * *